United States Patent [19]
Buchwald et al.

[11] Patent Number: 5,476,603
[45] Date of Patent: Dec. 19, 1995

[54] COMPOSITIONS COMPRISING CHLORINE-FREE, OPTIONALLY HYDROGEN-CONTAINING FLUOROCARBONS

[75] Inventors: Hans Buchwald, Ronnenberg; Joachim Hellmann, Hanover; Boleslaus Raszkowski, Wiedensahl, all of Germany

[73] Assignee: Solvay Fluor und Derivate GmbH, Hanover, Germany

[21] Appl. No.: 262,930

[22] Filed: Jun. 21, 1994

[30] Foreign Application Priority Data

Jun. 26, 1993 [DE] Germany ............... 43 21 288.3

[51] Int. Cl.$^6$ ............................................. C10M 105/52
[52] U.S. Cl. ........................................... 252/58; 252/56 R
[58] Field of Search .................... 252/58, 56 R, 252/68; 106/2; C10M 105/00, 105/52

[56] References Cited

U.S. PATENT DOCUMENTS

| | | | |
|---|---|---|---|
| 4,659,493 | 4/1987 | Feist et al. | |
| 4,746,463 | 5/1988 | Feist et al. | |
| 4,975,212 | 12/1990 | Thomas et al. | 252/58 X |
| 5,370,812 | 12/1994 | Brown | 252/68 |

FOREIGN PATENT DOCUMENTS

| | | |
|---|---|---|
| 1248131 | 1/1989 | Canada . |
| 0445611 | 9/1991 | European Pat. Off. . |
| 55-165925 | 12/1980 | Japan . |
| 60-096684 | 5/1985 | Japan . |
| 62-116776 | 5/1987 | Japan . |
| 1-133049 | 8/1989 | Japan . |
| 3-096391 | 4/1991 | Japan . |
| 5-051478 | 3/1993 | Japan . |
| 5-086223 | 4/1993 | Japan . |
| 9118073 | 11/1991 | WIPO . |

OTHER PUBLICATIONS

Schardt, *Kunststoffe*, vol. 72, No. 8, pp. 461–462 (1982) Aug.

*Primary Examiner*—Prince Willis, Jr.
*Assistant Examiner*—Cephia D. Toomer
*Attorney, Agent, or Firm*—Evenson, McKeown, Edwards & Lenahan

[57] ABSTRACT

Compositions which are liquefied under pressure, are suitable as release agents and comprise a fluorocarbon (FC) from the group comprising R134a, R143a, R125, R32, R143, R134, R23, R152a, R14 and R116 and an agent having a releasing action and, if appropriate, other additives, customary for release agents are described; the compositions with the hydrogen-containing fluorocarbons (HFC) mentioned are preferred here. The use of the compositions as release agents and a process for their preparation are likewise described.

19 Claims, No Drawings

COMPOSITIONS COMPRISING CHLORINE-FREE, OPTIONALLY HYDROGEN-CONTAINING FLUOROCARBONS

BACKGROUND OF THE INVENTION

The present invention relates to the use of chlorine-free fluorocarbons (FC), especially hydrogen-containing fluorocarbons (HFC), as constituents of release agent compositions; to a process for preparing such release agent compositions, and to the use of these compositions as release agents.

In many industrial processes, it is necessary to use agents with which the affinity between various materials, for example between a workpiece and a tool or between a molding and a mold, can be kept as low as possible. This is generally achieved by using release agents, depending on the working operation. Release agents are thus required for the production and processing of plastics, foams, building materials, rubber articles, tires, metals, glasses, ceramic products and the like which involve production techniques such as casting, shaping, pressing and the like. As used herein the term "release agent" refers to an agent which forms a solid or liquid film that reduces the adhesion between two adjacent surfaces, i.e. which prevents them from sticking together, and thus acts as a release agent, stripping agent or lubricant. Release agents may be solutions or dispersions of agents having a releasing action.

According to K. Schardt, Kunststoffe, Volume 72, pages 461–462, 1982, agents known to exhibit a releasing action include silicones, metal soaps, waxes, fatty oils, synthetic polymers and inorganic substances. Suitable solvents which may be mentioned include liquid aliphatic hydrocarbons, halogenated hydrocarbons and water.

The preparation of special wax derivatives which can be contained as ingredients having a lubricating and/or releasing action in release agents together with solvents is described in Canadian Patent No. CA 1,248,131. See also Feist et al., U.S. Pat. Nos. 4,659,493 and 4,746,463, the disclosures of which are hereby incorporated herein by reference. Solvents mentioned as suitable include the chlorofluorocarbons trichloromonofluoromethane (R11), 1,1,2-trichloro-1,2,2-trifluoroethane (R113), 1,1,2,2tetrachlorodifluoroethane (R112), tetrachloromonofluoroethane (R121) and/or trichlorodifluoroethane (R122).

Despite the efforts of the prior art, there remains a need for improved release agent compositions.

SUMMARY OF THE INVENTION

It is the object of this invention to provide new fluorocarbon or fluorohydrocarbon compositions.

Another object of the invention is to provide compositions which are less harmful to the environment than chlorine-containing halocarbons.

A further object of the invention is to provide new compositions for use in working or processing of workpieces of different materials under separating conditions.

It is also an object of the invention to provide release agent compositions which allow economic use and a low consumption of energy during use.

An additional object of the invention is to provide mold release agent compositions which can be used without necessitating frequent cleaning of the molds.

Yet another object of the invention was to provide a process for preparing new release agent compositions.

These and other objects of the invention are achieved by providing a composition which is liquefied under pressure and comprises at least one fluorocarbon selected from the group consisting of 1,1,1,2-tetrafluoroethane (R134a), 1,1,1-trifluoroethane (R143a), pentafluoroethane (R125), difluoromethane (R32), 1,1,2-trifluoroethane (R143), 1,1,2,2-tetrafluoroethane (R134), trifluoromethane (R23), 1,1-difluoroethane (R152a), tetrafluoromethane (R14) and hexafluoroethane (R116); and an agent having a releasing action.

In accordance with other aspects of the invention, its objects are also achieved by providing a method of promoting separation between a shaping tool and an article formed to a desired shape by the tool, comprising coating the tool with a release agent composition which is liquefied under pressure and comprises an agent having a releasing action and at least one fluorocarbon selected from the group consisting of 1,1,1,2-tetrafluoroethane (R134a), 1,1,1-trifluoroethane (R143a), pentafluoroethane (R125), difluoromethane (R32), 1,1,2-trifluoroethane (R143), 1,1,2,2-tetrafluoroethane (R134), trifluoromethane (R23), 1,1-difluoroethane (R152a), tetrafluoromethane (R14) and hexafluoroethane (R116); and evaporating the at least one fluorocarbon prior to forming the article to the desired shape.

Some of the objects of the invention are also achieved by providing a process for preparing a release agent composition comprising forming a solution or dispersion comprising at least 15% by wt. of a fluorocarbon selected from the group consisting of 1,1,1,2-tetrafluoroethane (R134a), 1,1,1-trifluoroethane (R143a), pentafluoroethane (R125), difluoromethane (R32), 1,1,2-trifluoroethane (R143), 1,1,2,2-tetrafluoroethane (R134), trifluoromethane (R23), 1,1-difluoroethane (R152a), tetrafluoromethane (R14) and hexafluoroethane (R116), and mixtures thereof; from 0.1 to 40% by weight of an agent having a releasing action; 0 to 80% by weight of a solubilizing agent; 0 to 1% by weight of a stabilizer; and 0 to 1% by weight of a corrosion inhibitor, for a total of 100% by weight.

DETAILED DESCRIPTION OF PREFERRED EMBODIMENTS

The invention relates to compositions which are liquefied under pressure, are suitable as release agents and comprise:
at least one chlorine-free fluorocarbon (FC) selected from the group consisting of:
  R 134a=1,1,1,2-tetrafluoroethane
  R 143a=1,1,1-trifluoroethane
  R 125=pentafluoroethane
  R 32=difluoromethane
  R 143=1,1,2-trifluoroethane
  R 134=1,1,2,2-tetrafluoroethane
  R 23=trifluoromethane
  R 152a =1,1-difluoroethane
  R 14=tetrafluoromethane, and
  R 116=hexafluoroethane;
an agent having a releasing action, and
optionally, one or more conventional release agent additives selected from the group consisting of solubilizing agents, corrosion inhibitors and stabilizers.

The fluorocarbons comprised by the compositions according to the invention are chlorine-free fluorine-containing halocarbon compounds which may be hydrogen-free (FC) or which preferably also contain hydrogen (HFC).

These fluorocarbons selected according to the invention for the release agent compositions are gases which are liquefied under pressure and which have a dissolving power which is slight per se but which, despite the absence of chlorine, have an adequate dissolving power or dispersing power.

Preferred fluorocarbons are hydrogen-containing fluorocarbon compounds (HFCs), preferably R134a and R125, and particularly R134a. These HFCs are distinguished by particularly good dispersing properties in the compositions and offer the advantage of a low consumption of energy during use.

In one advantageous embodiment, the compositions which are liquefied under pressure and are suitable as release agents comprise at least 15% by weight of one of the aforementioned fluorocarbons. For example, they can comprise from 15 to 99.9% by weight of the fluorocarbon. In addition, they comprise 0.1 to 40% by weight, preferably 0.1 to 30% by weight, of agents having a releasing action, and optionally up to 80% by weight of solubilizing agents.

The compositions according to the invention can comprise, as the active agent, an agent having a releasing action selected from the group consisting of waxes, wax derivatives, paraffins, silicones, metal soaps, fats, oils, polymers and inorganic powders. Waxes and wax derivatives which may be used in the present invention include both naturally occurring waxes of animal or vegetable origin and synthetic waxes and wax derivatives. Of the naturally occurring waxes, naturally occurring waxes having a softening point of at least 40° C. are preferably employed.

In a preferred embodiment of the invention, the compositions according to the invention comprise waxes and/or wax derivatives selected from the group consisting of esters of long-chain carboxylic acids and monoalcohols having a total of 34 to 50 carbon atoms, sulfochlorinated or sulfidized derivatives thereof, derivatives thereof obtained by hydrogenation and derivatives thereof obtained by hydrogen fluoride treatment. Esters having an iodine number of less than 95, in particular 75 to 95, are preferred. Mixtures of such fatty acid esters are known in the art and are commercially available.

For example, wax derivatives containing a total of 34 to 50 carbon atoms which have been obtained by sulfochlorination, sulfidization, hydrogenation or hydrogen fluoride treatment of unsaturated long-chain esters of carboxylic acids with monoalcohols are suitable. Suitable sulfochlorinated and sulfidized esters are available as commercial products.

The partly or completely saturated wax derivatives containing a total of 34 to 50 carbon atoms obtained by hydrogenation of unsaturated long-chain esters of carboxylic acids with monoalcohols can also be used. The term "partly saturated derivatives" refers to derivatives having an iodine number lower than that of the educt employed for the hydrogenation. For example, esters having iodine numbers of less than about 40 can be employed as partly saturated to saturated derivatives. Both partly saturated and saturated esters which are suitable are commercially available.

Wax derivatives containing a total of 34 to 50 carbon atoms obtained by hydrogen fluoride treatment of unsaturated long-chain esters of carboxylic acids with monoalcohols can also be employed. Suitable derivatives obtained by hydrogen fluoride treatment include, for example, the fluorine-containing waxy compositions described in Feist et al., Canadian Patent No. 1,248,131, the fluorine content of which can be varied over a wide range. The fluorine content of these adducts of hydrogen fluoride and unsaturated long-chain esters may lie, for example, in the range from 0.1 to 4.3% by weight. A completely different type of derivative obtainable by hydrogen fluoride treatment of long-chain unsaturated esters is the oily products (referred to hereinafter as sesquimers) which have 1.1 to 1.9 times the molecular weight of the starting wax and contain less than 1% by weight unreacted wax. These wax derivatives contain little or no bonded fluorine. As a rule, their fluorine content is less than 0.1% by weight and their iodine number is from 5 to 20. See also Feist et al., U.S. Pat. Nos. 4,659,493 and 4,746,463, the disclosures of which are hereby incorporated by reference.

Other waxes which can be used in the present invention include paraffin waxes or synthetic waxes, i.e. in particular polymers, such as, for example, polyethylene waxes or optionally oxidized polyethylene waxes. Thus, for example, an oxidized polyethylene wax having an average molecular weight of 3700 to 4500 (measured by viscometry) is suitable.

The compositions according to the invention can also comprise silicones as releasing agents. The silicones used can be in the form of oils, fats or resins. The silicones can be used as such or in the form of silicone emulsions or silicone pastes which comprise a consistency regulator, for example highly disperse silicic acid, incorporated into the silicone oil. Silicone fats may have metal soaps incorporated therein as consistency-regulating constituents. The silicone products used in the present invention are commercially available products. A silicone oil having a wide viscosity range in the range from 100 to 60,000 mm$^2$/s, in particular having a viscosity of 10,000 to 30,000 mm$^2$/s, for example, can be employed as the silicone oil. Silicone oils having viscosities of 15,000 to 25,000 mm$^2$/s are particularly advantageous.

Metal soaps, for example fatty acid salts of the metals magnesium, calcium, zinc, aluminum or lead, are also suitable as agents having a releasing action. For example, metal salts of stearic acid may be employed. A preferred metal soap comprises magnesium stearate.

The compositions according to the invention can also comprise inorganic powders, preferably graphite, talc or mica, as further agents having a releasing action.

It is also possible to use in the compositions according to the invention other conventional agents which have releasing action properties, such as oils, for example mineral oils and ester oils. Other suitable agents which have a releasing action are polymers, for example polymeric alcohols, such as, for example, polyethylene glycol, polyamides, polyolefins or polytetrafluoroethylene waxes.

The concentrations of the agents having a releasing action in the compositions according to the invention can vary. A composition which is advantageously suitable as a release agent can thus expediently comprise the agent having a releasing action in an amount of 0.1 to 30% by weight.

In a preferred embodiment of the invention, the compositions according to the invention comprise conventional solubilizing agents for release agents. Such solubilizing agents may be selected from the group consisting of liquid aliphatic hydrocarbons having boiling points of up to 200° C. In general, the purpose of the solubilizing agent is to improve the dissolution of the agents having a releasing action which are used in the compositions. Solubilizing agents are particularly suitable for improving the dissolution of saturated, partly saturated and/or sulfochlorinated or sulfidized derivatives, and/or derivatives obtained by hydrogen fluoride treatment, of esters of long-chain carboxylic acids and monoalcohols containing a total of 34 to 50 carbon atoms. Examples of such solubilizing agents include, for example, heptane or gasoline fractions having a boiling range from 100° to 140° C. Of course, other solubilizing agents known to persons skilled in the art can also be used.

The release agent compositions can comprise customary solubilizing agents in amounts of up to 80% by weight. The compositions according to the invention advantageously comprise solubilizing agents in an amount of 1 to 80% by weight, preferably 20 to 80% by weight. Gasoline fractions having a boiling range within 100° to 140° C. are preferably employed as solubilizing agents in an amount of 25 to 75% by weight.

In further embodiments of the compositions according to the invention, it may be advantageous to add known stabilizers and/or corrosion inhibitors in an amount of up to 1% by weight. The compositions according to the invention can therefore comprise commercially available corrosion inhibitors for metals, such as, for example, magnesium, aluminum, titanium, brass, bronze or steel. Such corrosion inhibitors are usually compositions which comprise organic compounds containing heteroatoms, such as sulfur or, in particular, nitrogen. Substances which have proved suitable include, for example, individual compounds or mixtures from the class comprising benzothiazoles, for example mercaptobenzothiazole; benzimidazoles, for example 2-phenyl-benzimidazole; triazoles, for example benzotriazoles and tolyltriazoles; oxazolines, for example alkyl- and/or hydroxyalkyl-substituted oxazolines; amides and amines, for example tertiary amines. Corrosion inhibitors based on oxazoline have proved particularly advantageous in the invention.

The compositions according to the invention may be in the form of either solutions or dispersions. As used herein, the term "dispersions" includes to both emulsions and suspensions.

The invention also relates to a process for preparing the compositions according to the invention, in which one or more agents having a releasing action and optionally other conventional release agent additives selected from the group consisting of solubilizing agents, corrosion inhibitors and stabilizers are incorporated into the particular fluorocarbon of the composition.

The invention furthermore also relates to the use of the compositions as release agents, for example in the preparation of plastics or foams or in other fields of use. The compositions according to the invention can also be used as release agents, for example, in the processing of metals or plastics. The compositions according to the invention advantageously reduce the adhesion between the tool and workpiece or between the mold and molding of metal or plastic, for example of polyesters, silicone polymers or polyurethanes. Preferably, the compositions according to the invention are suitable as release agents in the production of shaped plastic articles, particularly foamed articles. By using the composition according to the invention as a release agent, surface problems between the tool and workpiece can be avoided, for example during injection molding of plastics. The compositions according to the invention can be used very successfully as release agents in foaming polyurethane, where they have hardly any adverse effect on foam formation. One advantage of the release agents according to the invention is that they can be employed in a highly energy-saving manner. As is known in the production of foams, after the mold has been coated with the release agent, the solvent must then be evaporated. If a composition according to the invention is used, the mold needs to be heated far less in order to evaporate the solvent than in the case of other conventional compositions which are already known, since the fluorocarbons used in the present invention are gases liquefied under pressure having a low boiling point. The release agents according to the invention are likewise a valuable production aid which facilitates release from the mold in the casting of plastics. Additional advantages of the compositions according to the invention manifest themselves during prolonged mold use in that, for example, the molds used have to be cleaned less frequently between work cycles. The release agents according to the invention can be used in the customary manner, for example as liquids, pastes or sprayable release agents, which are applied, for example, with hand sprayers, aerosol cans or automatic spray systems.

The compositions according to the invention which contain the aforementioned fluorocarbons as diluents or solvents have good adhesion-reducing properties, high chemical inertness, a good spreading power and a high productivity. Furthermore, the fluorocarbon content in the compositions according to the invention causes an increase in the flash point, so that some of the compositions practically no longer exhibit a flash point. The suitability of the fluorocarbons for release agent compositions is also very surprising, since they have only a low dissolving power because of their lack of chlorine.

The following examples are intended to illustrate the invention in further detail without limiting its scope. Compositions according to the invention comprising other proportions of ingredients and/or comprising fluorocarbons other than the fluorocarbons mentioned in the following examples can be prepared in an analogous manner.

EXAMPLE 1

A composition according to the invention was prepared by mixing 2% by weight of HF-wax adduct (=product of Example 1 of Feist et al., Canadian Patent No. CA 1,248, 131) 50.0% by weight of 1,1,1,2-tetrafluoroethane (R 134a) and 48.0% by weight of a gasoline fraction having a boiling range of 100° to 140° C. with one another. The term "HF-wax adduct" refers to a wax derivative containing a total of 34 to 50 carbon atoms obtained by hydrogen fluoride treatment of unsaturated long-chain esters of carboxylic acids with monoalcohols, whereby hydrogen fluoride is added onto the double bonds of the educt. The preparation of this HF-wax adduct corresponds to Example 1 of Feist et al., Canadian Patent No. 1,248,131. The composition according to the invention was obtained as a solution which had good release agent properties.

EXAMPLES 2 TO 10

The other Examples 2 to 10 of compositions according to the invention shown in the following table, which likewise have outstanding release agent properties, were prepared analogously to Example 1. The proportions of the components are given in % by weight.

|  | Examples 2–10 | | | | | | | | |
| --- | --- | --- | --- | --- | --- | --- | --- | --- | --- |
| Composition constituents | 2 | 3 | 4 | 5 | 6 | 7 | 8 | 9 | 10 |
| R 134a | 47.5 | 40.0 | | | | | | | |
| R 143a | | | 55.0 | 50.0 | 40.0 | 50.0 | | | 40.0 |
| R 125 | | | | | | | | 35.0 | |
| R 32 | | | | | | | 20.0 | | |
| Sesquimer* | | | | | 27.0 | | | | |
| Wax ester (iodine number 85) | | | | | | | | | 32.0 |
| Silicone oil (20,000 mm²/s) | | | 4.0 | | | | | | |
| Paraffin (Melting point 56–58° C.) | | 30.0 | | | | 10.0 | 6.0 | | |
| Oxidized polyethylene wax (Melting point 89–99° C.) | 5.0 | | | 4.0 | | | | 5.0 | |
| Polyethylene wax (Melting point 98–108° C. | | | | | 3.0 | | | | 3.0 |
| Magnesium stearate | | | | | | | | 1.0 | |
| Gasoline fraction (100–140° C.) | 47.5 | 30.0 | 41.0 | 46.0 | 30.0 | 40.0 | 74.0 | 59.0 | 25.0 |
| Nature of the composition** | D | D | S | D | D | D | S | D | D |

*Substance of Example 2 of Feist et al., Canadain Patent No. CA 1,248,131
**S = clear solution; D = dispersion The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A composition which is liquefied under pressure and comprises:

at least one fluorocarbon selected from the group consisting of 1,1,1,2-tetrafluoroethane (R134a), 1,1,1-trifluoroethane (R143a), pentafluoroethane (R125), difluoromethane (R32), 1,1,2-trifluoroethane (R143), 1,1,2,2-tetrafluoroethane (R134), trifluoromethane (R23), 1,1-difluoroethane (R152a), tetrafluoromethane (R14) and hexafluoroethane (R116); and an agent having a releasing action which is selected from the group consisting of
   a) waxy esters containing a total of 34 to 50 carbon atoms formed from long-chain carboxylic acids and monoalcohols, sulfochlorinated or sulfidized derivatives thereof, derivatives thereof obtained by hydrogenation, and derivatives thereof obtained by hydrogen fluoride treatment;
   b) paraffin wax or a synthetic wax;
   c) polyethylene wax or an oxidized polyethylene wax; and
   d) a metal soap of magnesium, calcium, zinc, aluminum or lead.

2. A composition according to claim 1, further comprising at least one conventional additive selected from the group consisting of solubilizing agents, corrosion inhibitors and stabilizers.

3. A composition according to claim 1, wherein said fluorocarbon is a hydrogen-containing fluorocarbon.

4. A composition according to claim 3, wherein said hydrogen-containing fluorocarbon is 1,1,1,2 -tetrafluoroethane (R134a) or pentafluoroethane (R125).

5. A composition according to claim 1, comprising at least 15% by weight of said fluorocarbon, and 0.1 to 40% by weight of said agent having a releasing action.

6. A composition according to claim 2, comprising at least 15% by weight of said fluorocarbon, 0.1 to 40% by weight of said agent having a releasing action, and up to 80% by weight of solubilizing agent.

7. A composition according to claim 3, comprising from 0.1 to 30% by weight of said agent having a releasing action.

8. A composition according to claim 1, wherein said agent having a releasing action is selected from the group consisting of waxy esters containing a total of 34 to 50 carbon atoms formed from long-chain carboxylic acids and monoalcohols, sulfochlorinated or sulfidized derivatives thereof, derivatives thereof obtained by hydrogenation, and derivatives thereof obtained by hydrogen fluoride treatment.

9. A composition according to claim 8, wherein said agent having a releasing action has an iodine number of less than 95.

10. A composition according to claim 1, wherein said agent having a releasing action is a paraffin wax or a synthetic wax.

11. A composition according to claim 1, wherein said agent having a releasing action is a polyethylene wax or an oxidized polyethylene wax.

12. A composition according to claim 1, wherein said agent having a releasing action comprises a metal soap of magnesium, calcium, zinc, aluminum or lead.

13. A composition according to claim 2, comprising a solubilizing agent which is a liquid aliphatic hydrocarbons having a boiling point of up to 200° C.

14. A composition according to claim 13, which comprises from 1 to 80% by weight of said solubilizing agent.

15. A composition according to claim 14, which comprises from 20 to 80% by weight of said solubilizing agent.

16. A composition according to claim 15, which comprises from 25 to 75% by weight of said solubilizing agent, and said solubilizing agent is a gasoline fraction having a boiling range within 100° to 140° C.

17. A composition according to claim 2, comprising up to 1% by weight of a stabilizer or a corrosion inhibitor.

18. A method of promoting separation between a shaping tool and an article formed to a desired shape by said tool, said method comprising coating said tool with a release agent composition which is liquefied under pressure and comprises an agent having a releasing action which is selected from the group consisting of a) waxy esters containing a total of 34 to 50 carbon atoms formed from long-chain carboxylic acids and monoalcohols, sulfochlorinated or sulfidized derivatives thereof, derivatives thereof obtained by hydrogenation, and derivatives thereof obtained by hydrogen fluoride treatment;

b) paraffin wax or a synthetic wax;

c) polyethylene wax or an oxidized polyethylene wax; and d) a metal soap of magnesium, calcium, zinc, aluminum or lead;

and at least one fluorocarbon selected from the group consisting of 1,1,1,2-tetrafluoroethane (R134a), 1,1,1-trifluoroethane (R143a), pentafluoroethane (R125), difluoromethane (R32), 1,1,2trifluoroethane (R143), 1,1,2,2-tetrafluoroethane (R134), trifluoromethane (R23), 1,1-difluoroethane (R152a), tetrafluoromethane (R14) and hexafluoroethane (R116); and evaporating said at least one fluorocarbon prior to forming said article to the desired shape.

19. A process for preparing a release agent composition comprising forming a solution or dispersion comprising:

at least 15% by wt. of a fluorocarbon selected from the group consisting of 1,1,1,2-tetrafluoroethane (R134a), 1,1,1-trifluoroethane (R143a), pentafluoroethane (R125), difluoromethane (R32), 1,1,2-trifluoroethane (R143), 1,1,2,2-tetrafluoroethane (R134), trifluoromethane (R23), 1,1-difluoroethane (R152a), tetrafluoromethane (R14) and hexafluoroethane (R116), and mixtures thereof;

from 0.1 to 40% by weight of an agent having a releasing action which is selected from the group consisting of a) waxy esters containing a total of 34 to 50 carbon atoms formed from long-chain carboxylic acids and monoalcohols, sulfochlorinated or sulfidized derivatives thereof, derivatives thereof obtained by hydrogenation, and derivatives thereof obtained by hydrogen fluoride treatment;

b) paraffin wax or a synthetic wax;

c) polyethylene wax or an oxidized polyethylene wax; and d) a metal soap of magnesium, calcium, zinc, aluminum or lead;

0 to 80% by weight of a solubilizing agent;

0 to 1% by weight of a stabilizer; and 0 to 1% by weight of a corrosion inhibitor, for a total of 100% by weight.

* * * * *